Figure 1:
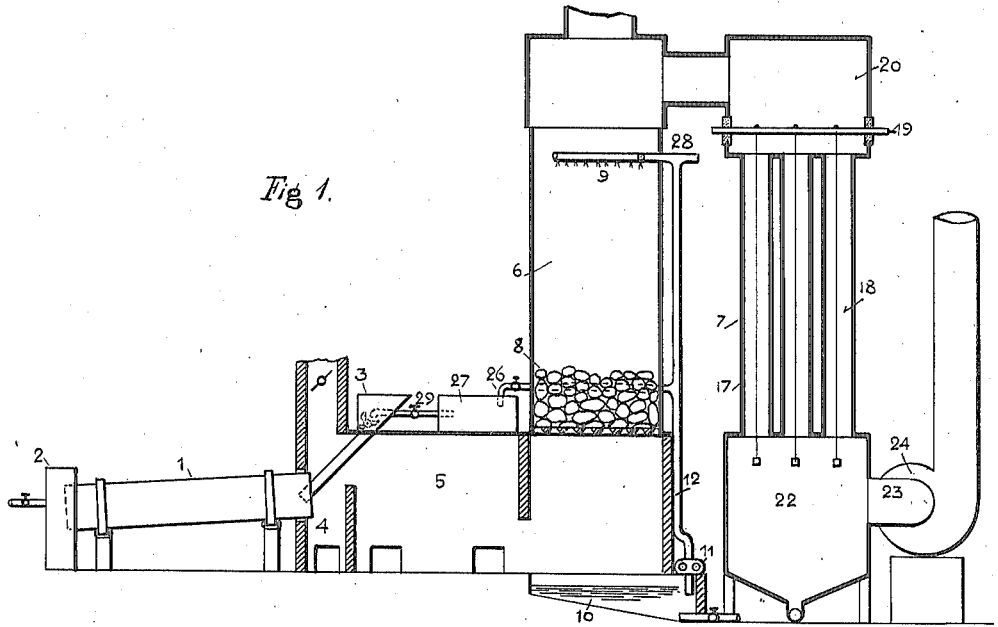

F. B. CHURCH.
PROCESS AND APPARATUS FOR RECOVERING METALLIC VALUES FROM ORES.
APPLICATION FILED SEPT. 5, 1919.

1,393,428.

Patented Oct. 11, 1921.
2 SHEETS—SHEET 1.

INVENTOR
Frederick B. Church

BY
Arthur P. Knight
ATTORNEY

F. B. CHURCH.
PROCESS AND APPARATUS FOR RECOVERING METALLIC VALUES FROM ORES.
APPLICATION FILED SEPT. 5, 1919.
1,393,428.
Patented Oct. 11, 1921.
2 SHEETS—SHEET 2.
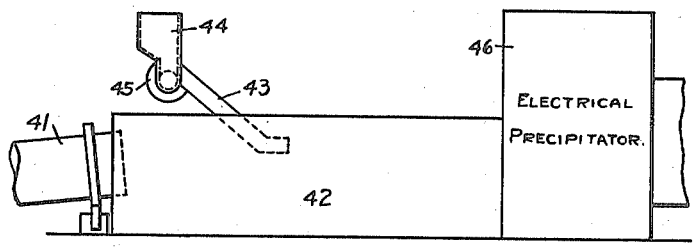
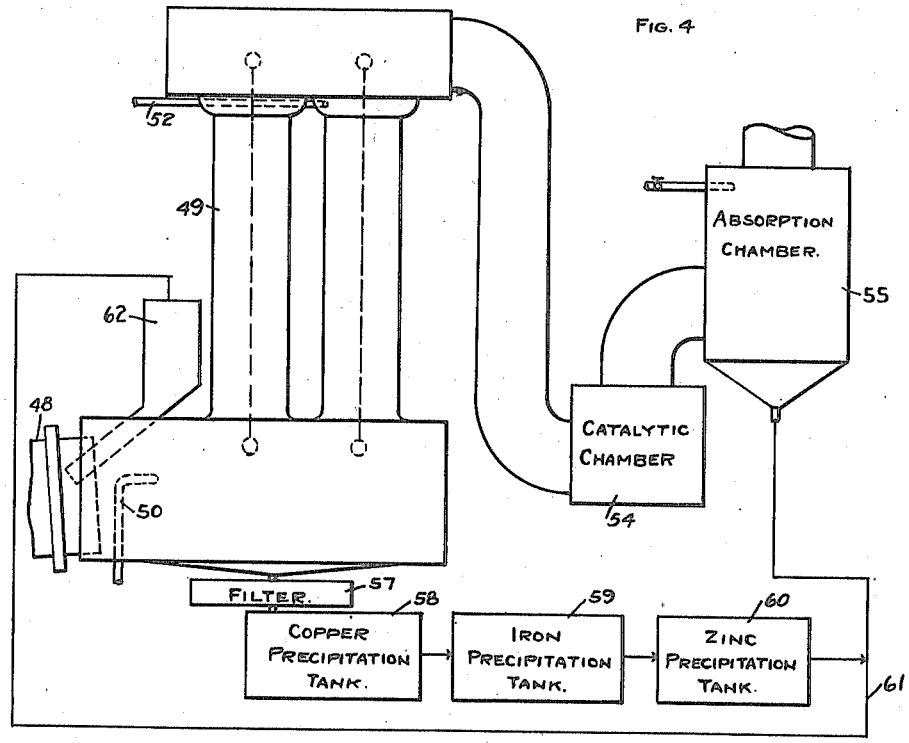
INVENTOR.
Frederick B. Church
BY Arthur P. Knight
ATTORNEY

UNITED STATES PATENT OFFICE.

FREDERICK B. CHURCH, OF AZUSA, CALIFORNIA, ASSIGNOR TO INTERNATIONAL PRE-CIPITATION COMPANY, OF LOS ANGELES, CALIFORNIA, A CORPORATION OF CALIFORNIA.

PROCESS AND APPARATUS FOR RECOVERING METALLIC VALUES FROM ORES.

1,393,428.             Specification of Letters Patent.       Patented Oct. 11, 1921.

Application filed September 5, 1919. Serial No. 321,922.

*To all whom it may concern:*

Be it known that I, FREDERICK B. CHURCH, a citizen of the United States, residing at Azusa, in the county of Los Angeles and State of California, have invented new and useful Processes and Apparatus for Recovering Metallic Values From Ores, of which the following is a specification.

This invention relates to the recovery or separation of metals, such as copper, lead, etc., from ores thereof by volatilization of the metallic values to form fume, and the collection of such fume. In order to secure effective volatilization, it has been found desirable to use agents for increasing volatilization of the metallic values and, in this connection, halogens or halids have been found especially effective, particularly sodium chlorid, or other chlorids of an alkaline or alkaline earth metal, have been found to be especially effective. In cases where such chlorids are used as so-called volatilization agents, it has been found that under the conditions of heat and of concentration of the volatilizing agents required for effective volatilization of the metallic values that a considerable proportion of the chlorin contained in the reacting halogen compound passes off in the form of free chlorin or of hydrochloric acid, and is therefore wasted as far as actually taking part in the reaction is concerned. A part of the chlorin supplied to the heating operation, for example, in the form of sodium chlorid mixed with the ore to be treated, is utilized in converting to the form of chlorid the metal that is to be recovered, such chlorid being volatilized and eventually collected; another part of the chlorin supplied to the process is taken up by the base metals present, the resulting compound being either volatilized or retained in the charge, as the case may be. That part which is retained in the charge may, in general, be considered as an irrecoverable loss. That part of the chlorin which combines with such base metals and is volatilized as a base metal chlorid can be collected and, in some cases, utilized; another part of the chlorin supplied to the operation passes off as stated, either in the form of free chlorin or in the form of hydrochloric acid and has generally been wasted or lost in the operation of the process.

The main object of the present invention is to provide for the economical and effective recovery and use of the chlorin or halogen passing off in the form, either of free chlorin or hydrochloric acid, or generally in the form of a halogen-bearing gas. I accomplish this result by passing the gases at a suitable stage of the operation in contact with a basic reagent, such as a solution, or emulsion, or powder, of alkaline earth, alkali, or other base, capable of reacting with the gaseous chlorin (or other halogen) bearing material to form a non-gaseous compound of chlorin (or other halogen), which is or may be then used as a chloridizing agent in cyclic repetition of the process.

Figure 2:
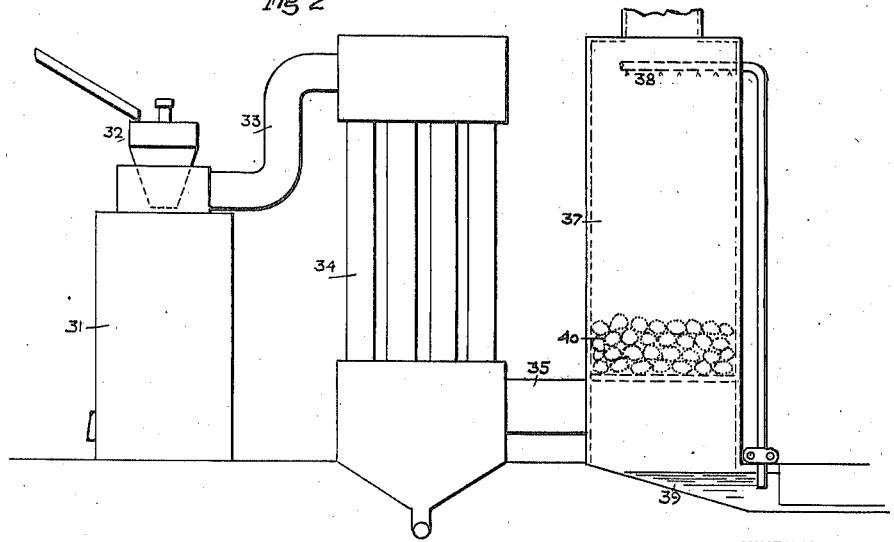

The accompanying drawing illustrates an embodiment of the apparatus used in my invention, Figure 1 being a longitudinal section of one form of such an apparatus, and Fig. 2 a side elevation partly in section of a modified form of the apparatus. Figs. 3 and 4 are diagrammatic side elevations of modified forms of the apparatus.

Referring to Fig. 1, a heating furnace, such as a rotary kiln, indicated at 1, is provided with burner means 2 and with means 3 for supplying a mix of finely divided ore and volatilizing agent thereto, said kiln having an outlet 4 leading to the apparatus for collecting the volatilized fume, such apparatus may include a settling chamber 5 for settling out heavy dust, a tower 6 for removing the chlorin bearing gases and a precipitator or fume separator 7 for collecting the fumes carrying the metallic values. In the form shown in Fig. 1, the tower 6 for absorbing the chlorin bearing gases is arranged to receive the gases before they pass to the precipitator or fume separator 7 and is shown as consisting of a vertical chamber inclosing a bed of fragmentary solid material, preferably of limestone, indicated at 8, and spray means 9 at the top of the chamber for spraying liquid onto said bed, such liquid consisting, for example, of water or of limewater, or solution of alkali or alkaline earth, supplied from any suitable source. A sump 10 may be provided at the bottom of the tower in which the liquid collects and from which a portion of the liquid may be circulated by pump 11 and pipe 12 back to the spray means 9.

The fume separator 7 is preferably of the electrical precipitator type comprising, for example, a plurality of collecting electrodes, indicated at 17, discharge electrodes 18 extending opposite the same and suitably insulated and connected by wire 19 to a suitable high potential circuit so as to maintain the said discharge electrodes 18 at a suitable high potential difference relative to the collecting electrodes 17, which are grounded, as to cause electrical precipitation of the fume passing between said electrodes. In the form of the apparatus shown in the drawing the collecting electrodes are formed as vertical tubes connected at their upper ends to a header 20 communicating with the upper end of tower 6 to pipe 21, and at their lower ends to a header 22, whose outlet 23 leads to a stack, a blower 24 being provided, if necessary, to induce the required draft through the apparatus.

The operation of my process in this form of the apparatus is as follows:

A mixture of finely divided ore and of a base metal halid, preferably sodium chlorid, is supplied through means 3 to the rotary kiln 1 and in the operation of said kiln passes down through the kiln in reverse direction to the current of hot gases from the burner 2 with the result that the said mixture becomes heated sufficiently to cause the required amount of metallic values in the ore to be volatilized and to pass out through the outlet 4 and through settling chamber 5 to the bottom of the tower or gas absorbing means 6. It has been found that in practice substantially all of the metallic values driven off from the ore by this operation are in the form of extremely fine fume, which does not settle in the settling chamber 5 and is not absorbed or collected to any considerable extent on contact with water and such fume therefore passes upwardly through the tower 6 with little, if any, separation or collection of the metallic values therein contained. Any hydrochloric acid in such cases is rapidly absorbed by the water passing down in sprays from the means 9 and running over the surface of the bed of material 8. The efficiency of collection in the case of hydrochloric acid is considerable even when water is used as the absorbing medium, but I prefer to use a solution of an alkaline or basic reagent, for example, limewater, and to construct the bed 8 of limestone, or other basic material, so that the hydrochloric acid in passing in contact with the sprays and with the bed 8 and the limewater running thereover is rapidly absorbed, forming a calcium chlorid solution which collects in the sump 10. As the solution is pumped back from the sump to the spray means 9 and is reused in the absorbing operation, the concentration of calcium chlorid in the resulting solution progressively increases. It is therefore desirable to continually or intermittently withdraw some of the liquid, for example, through an outlet pipe 26 to an evaporating pan 27, sufficient fresh limewater being introduced by a connection 28 to compensate for the loss of liquid through evaporation in the tower and withdrawal through the outlet 26. The concentrated calcium chlorid solution produced in the evaporating pan 27 may be passed by connection 29 to the ore supply means 3, so as to provide part of the chlorin required for the volatilizing operation, sufficient sodium chlorid being added to the mix to make up for any loss or wastage of chlorin in the process. The fumes pass from the top of the tower 6 through connection 21 to the precipitator 7 wherein the fumes are precipitated by electrical action and are collected at the bottom of the header 22 and removed continuously or from time to time, the precipitate so collected being then treated for separation of the metal therefrom.

Any chlorin contained in the gases will also be absorbed in the limewater passing down through the tower 6, it being understood that to enable the chlorin absorption in this manner the presence of a basic reagent, such as calcium hydroxid, is necessary. Other basic reagents may be used for accelerating absorption of the chlorin and of the hydroxid, for example, sodium hydroxid. In some cases, it may be desirable to use a solid reagent, such as finely divided lime or finely divided ferric hydroxid, and, in such cases, such materials may be applied in the form of suspension in water, for example, milk of lime.

The arrangement of the apparatus as above described wherein the spraying tower is arranged ahead of the fume separator is of especial advantage in connection with the operation of a separator of the electrical precipitator type for the reason that the cooling and humidification of the gases in the tower 6 renders the operation of the electrical precipitator more effective. In some cases, this humidification may be sufficient to cause the suspended material to be precipitated on the electrodes 17 in fluid form so that the same will run down into the header 22 and out through a suitable outlet; in other cases, it is desirable to provide only sufficient humidification to facilitate the precipitation of the material in solid condition and the precipitate is, in that case, removed from the collecting electrodes by jarring or otherwise.

In cases where it is desirable to remove the metallic values before recovery or removal of the chlorin bearing gases the apparatus shown in Fig. 2 may be adopted. In this apparatus a furnace 31 provided with ore supply means 32 is conected by an outlet pipe 33 to an electrical precipitator 34 of any suitable construction, the outlet pipe 35 of which leads to the bottom of a spray tower 37 provided with spray means 38, a sump 39 and with a bed 40 of limestone or other fragmentary material.

In carrying out my process in this apparatus the mixture of ore reduced to a suitable state of division and sodium chlorid is heated in furnace 31 sufficiently to cause the metallic values to be driven off in the form of fume, such fume being precipitated in the electrical precipitator 34, the residual gases then pass from said precipitator through the spray tower 37 wherein the hydrochloric acid and chlorin are absorbed in the manner above described.

In place of the tower 37, other gas absorbing apparatus may be used, for example, the apparatus disclosed in the patent to Bradley and Schmidt—No. 1,221,505—April 3, 1917—wherein a finely divided solid absorbent is distributed into the gases so as to absorb the desired constituent of the gases, the suspended particles containing such constituent being then electrically precipitated. Such an apparatus is illustrated in Fig. 3 wherein 41 indicates the kiln evolving the vapors and gases to be treated, 42 a flue for receiving said gases from the kiln, 43 a conduit for discharging into said flue solid absorbing material delivered from a supply means 44 into said conduit by blower 45, which causes said material to be injected into the flue 42, and 46 indicates an electrical precipitator for precipitating the suspended material with the chlorin constituents of the gases absorbed therein.

My invention may also be applied to the recovery of chlorin from a chloridizing volatilization process wherein the chlorin or hydrochloric acid are supplied in contact with the ore as the initial chloridizing agents, sufficient heat being applied at the same time to cause volatilization of the desired metal chlorid. In this case, the hot gases passing through the kiln or furnace in contact with the finely divided ore are supplied with sufficient chlorin or hydrochloric acid for the stated purpose and any chlorin or hydrochloric acid which is not utilized in the chloridizing operation and which passes off in gaseous form can be collected by passing the gases in contact with a basic reagent, for example, a basic compound of lime, such as calcium hydroxid, so as to collect the chlorin or hydrochloric acid, or generally the chlorin bearing constituent of the gases, in the form of a chlorid which can be and preferably is used as a chlorin bearing reagent for cyclic repetition of the choloridizing volatilization operation on a further quantity of ore.

While my invention is particularly adapted for use in choloridizing volatilization any other volatilizing agents capable of similar reactions may be used, for example, fluorin, or compounds thereof, may be used. Moreover, in place of lime, any basic reagent, such as an alkaline earth hydroxid, or carbonate, or alkali, or hydroxid, of other base metal such as iron may be used.

My process may also be carried out in such manner that the fumes carrying the metallic values and the chlorin bearing gaseous constituent are collected wholly or partly at the same time. For example, the gases and fumes passing from the volatilizing furnace indicated at 48 in Fig. 4 and containing the metallic chlorids resulting from the chloridizing volatilization, as above described, together with more or less free chlorin and hydrochloric acid, may be passed through an electric precipitator of the wet type, such as disclosed in the patent to H. A. Burns—No. 1,250,088—and indicated at 49 in Fig. 4 in which the collecting electrodes are of wood, terra cotta, or other material non-corrodible, over whose inner surfaces the film or stream of water or solution is caused to flow continuously or intermittently, such water being supplied at the top of the electrodes by piping 52 in the manner described in such patent. Or, if desired, the water may be condensed from the gases by supplying the requisite amount of water to the gases in the form of spray or steam for example, by a spray nozzle 50, and then cooling sufficiently to cause condensation of water, which is collected or precipitated on said collecting electrodes to form a down flowing stream thereon. In either case, the fumes containing the metallic values will be electrically precipitated on the collecting electrodes and collected in the body of water or solution flowing over the same with the result that the body of liquid passing from the electrodes would contain in solution soluble chlorids, such as chlorids of copper, mercury, zinc, sodium and potassium, and, if there are insoluble chlorids present, such as those of lead and silver, same would be collected as a sludge or insoluble matter carried by the solution. Any hydrochloric acid present will also be collected at the same time and some of the chlorin will be absorbed by the stream of water provided the temperature is maintained sufficiently low. The gases passing from this precipitating apparatus and containing the residue of the chlorin and hydrochloric acid could then be treated in any suitable manner for further absorption of these gaseous constituents, for example, by passing through a limestone tower substantially as shown at 6 in Fig. 1, or the gases could be passed through a catalytic or contact chamber indicated at 54 containing copper oxid, or other catalytic body, for converting the chlorin to hydrochloric acid, sufficient moisture being supplied with the gases in the form of steam or otherwise to provide for this reaction and the hydrochloric acid then absorbed, for example, in an absorption chamber indicated at 55, as above described. The solution drawn from the electrical precipitator in this case can then be treated for separation of the metallic values therefrom, for example, said solution being filtered in suitable filter means 57 and then passed over scrap iron in a tank 58 so as to remove from the solution any metals present therein which are less electropositive than iron, the precipitated product being treated in the usual manner to recover the metals therefrom. The residual solution may then contain chlorids of metals more electropositive than iron, together with hydrochloric acid and a small amount of iron dissolved by the acid solution from the scrap iron. Iron is precipitated from this solution in a tank 59 by a suitable alkaline earth carbonate and the refiltered solution may then be treated with sodium carbonate in a tank 60 to precipitate zinc carbonate. The alkali chlorids, or alkaline earth chlorids, in the final residual solution may then be utilized in cyclic repetition of the process by adding the solution or the product of the evaporation of same to dryness to a further quantity of finely divided ore.

The solution containing hydrochloric acid and chlorin produced by treatment of the residual gases, as above described, may also be utilized by returning the same to the volatilizing kiln or furnace. Thus, as indicated by the flow line 61 in Fig. 4, the effluent from the means 55 and 60 may be returned to ore supply means 62, which feeds the crushed ore to the furnace or kiln 48.

It will be understood that in the place of the electrical precipitator used in the last described process, a spray tower or collecting chamber containing solid obstructions over which water is caused to flow (as shown at 6 in Fig. 1) may be used for absorbing the hydrochloric acid.

As a further modification of the process last described, I may use instead of water in the electrical precipitator or in the spray tower or collecting chamber just described, a solution of alkali or alkaline earth or of alkaline carbonates with the result that hydrochloric acid and chlorin carried by the gases are more effectively collected and the necessity of a supplementary collecting action may be thus avoided. In this case, the metallic values present, particularly copper, lead and zinc, may be precipitated as hydroxids or carbonates and form a part of the sludge instead of the solution and the resulting sludge may be smelted or otherwise treated for recovery of these metals. The solution would then contain the alkali and alkaline earth or other base metal chlorids representing more or less completely the entire chlorin content of the original volatilizing agent, including the chlorin carried over in combination with the metal as well as the chlorin carried over in a free state and in the form of hydrochloric acid, and the resulting alkali or alkaline earth chlorids may then be utilized as volatilizing agents in the treatment of a further quantity of ore, the residual solution containing such chlorids being applied directly to the ore or being evaporated to dryness and the product mixed with the ore.

What I claim is:

1. In the art of recovery of metallic values from ores by chloridizing volatilization, the method of recovery of chlorin contained in gaseous constituents produced in the volatilizing operation, which consists in passing such constituents in contact with a basic absorbing medium.

2. The process which consists in subjecting an ore in the presence of a halogen bearing material to the action of heat sufficient to volatilize metallic values as halids, and passing the gases resulting from such heating operation, and containing a halogen constituent in gaseous form, in contact with a basic reagent, thereby absorbing such halogen constituent in combination with such reagent to form a halogen bearing material, and returning said halogen bearing material in cyclic repetition of the process for action on a further quantity of ore.

3. The process of recovery of metallic values from ores, which consists in heating the ores, together with a chlorin bearing reagent, by the action of a current of hot gases passing in contact with the ore and reagent in such manner as to drive off metallic values in the form of a chlorid containing a chlorin bearing constituent in gaseous form, passing the gases in contact with a basic reagent for combination with and absorption of the chlorin of such constituent to form a non-gaseous product, collecting such product and utilizing same in cyclic repetition of the process as a chlorin bearing reagent for admixture with a further quantity of ore, and collecting the metallic values volatilized from the ore separately from the said chlorin bearing reagent at any desired stage of the operation.

4. The process which consists in heating a mixture of ore and a base metal chlorid by passing a current of hot gases in contact therewith so as to volatilize and drive off the chlorid of the metal to be recovered and at the same time driving off a chlorin bearing gaseous constituent in the effluent gases, bringing the effluent gases in contact with a basic compound of an alkaline earth metal so as to absorb the chlorin bearing constituent of said gases, collecting the resulting product and also collecting the metallic chlorid volatilized from the ore and utilizing the compound of alkaline earth metal and chlorin produced in said operation by mixing the same with a further quantity of ore and heating in cyclic repetition of the process.

5. In the art of chloridizing volatilization, the method, which consists in heating ore in contact with a chloridizing agent to a sufficient temperature to volatilize metallic values from the ore at the same time producing chlorin bearing gases, subjecting said gases to contact with an absorbing medium to separate and recover chlorin therefrom and utilizing the chlorin bearing product so formed as a chloridizing agent in cyclic operation of the process.

6. The process, which consists in subjecting an ore in the presence of a halogen bearing material to the action of heat sufficient to volatilize metallic values, as halids, at the same time producing a halogen bearing gaseous constituent, passing the gases resulting from such heating action and containing said halogen bearing gaseous constituent in contact with an absorbing medium to absorb a halogen constituent, utilizing the resulting product as a halogen bearing material in admixture with ore in cyclic operation of the process, and separating from the gases in such cyclic operation the metallic values volatilized from the ore.

In testimony whereof I have hereunto subscribed my name this 29th day of August, 1919.

FREDERICK B. CHURCH.